| United States Patent [19] | [11] Patent Number: 4,766,193 |
| Nakasuji et al. | [45] Date of Patent: Aug. 23, 1988 |

[54] ADHESIVE FOR SILICONE RUBBERS

[75] Inventors: Katsuyoshi Nakasuji, Chiba, Japan; Ryuzo Mikami, Midland, Mich.; Kazuo Hiria; Takao Matsushita, both of Chiba, Japan

[73] Assignee: Toray Silicone Company, Ltd., Tokyo, Japan

[21] Appl. No.: 87,576

[22] Filed: Aug. 20, 1987

Related U.S. Application Data

[63] Continuation of Ser. No. 866,412, May 23, 1986, abandoned.

[30] Foreign Application Priority Data

Jun. 5, 1985 [JP] Japan .................................. 60-122046

[51] Int. Cl.$^4$ .............................................. C08G 77/06
[52] U.S. Cl. .......................................... 528/17; 528/18; 528/24; 427/387; 428/447
[58] Field of Search .............................. 528/17, 18, 24

[56] References Cited

U.S. PATENT DOCUMENTS 3,231,542 1/1966 Eisinger et al. ........................ 528/24
3,296,182 1/1967 Fekete .................................... 528/24
4,304,820 12/1981 Deubzer et al. ...................... 428/511

Primary Examiner—Melvyn I. Marquis
Attorney, Agent, or Firm—Edward C. Elliott

[57] ABSTRACT

The silicone rubber adhesive of the present invention is composed of a particular organopolysiloxane, condensation reaction catalyst and organoperoxide in restricted blending ratios. As a result, a characteristic of the present invention is that various organic materials may be tightly and durably bonded to silicone rubbers by applying the adhesive of the present invention to the surface of a cured silicone rubber and laying on and then curing an organic material such as a synthetic rubber composition, for example, ethylene-propylene terpolymer rubber or chloroprene rubber, or a phenol resin, epoxy resin, etc. In addition, it is also a characteristic of the present invention that silicone rubber may be tightly bonded to various materials by applying the silicone rubber adhesive of the present invention to various organic materials as mentioned above, bringing a silicone rubber composition which contains a curing catalyst into contact and then curing.

5 Claims, No Drawings

ADHESIVE FOR SILICONE RUBBERS

This is a continuation of co-pending application Ser. No. 866,412 filed on May 23, 1986, now abandoned.

BACKGROUND OF THE INVENTION

1. Field of the Invention

The present invention describes an adhesive for use with silicone rubbers. More specifically, the present invention describes an adhesive which bonds silicone rubbers to organic materials.

2. Background Information

Due to their excellent heat resistance, silicone rubbers have been used in a broad range of applications in which rubbery elasticity is required at elevated temperatures. However, silicone rubber is rather expensive compared to general-purpose synthetic rubbers and general-purpose plastics and it is somewhat inferior to a variety of synthetic rubbers and plastics in its mechanical properties, steam resistance and chemical resistance, etc. In order to eliminate these disadvantages in cost and properties, use is frequently made of a unified composite in which silicone rubber is bonded to an organic material, in particular, to a synthetic rubber or plastic. For example, the surface of a cured silicone rubber is coated with another synthetic rubber or, conversely, the surface of another synthetic rubber is coated with silicone rubber. Alternatively, use is made of a silicone rubber molding in which a part is bonded to an engineering resin serving as the support.

However, silicone rubbers are generally difficult to bond to synthetic rubbers and plastics. In particular, the surface of cured silicone rubbers is inert so they cannot be bonded to synthetic rubbers or plastics or even to silicone rubber. Among synthetic rubbers and plastics, it is particularly difficult to bond synthetic polyolefin rubbers and polyolefin plastics to silicone rubbers. Due to this, the development is required of an effective adhesive.

SUMMARY OF THE INVENTION

An adhesive for use with silicone rubber consists of an organopolysiloxane containing alkenyl groups and hydroxyl or alkoxy groups, a condensation reaction catalyst, and an organoperoxide. Silicone rubbers can be bonded to various materials by applying the silicone rubber adhesive to the materials, applying a silicone rubber composition over the adhesive, and then curing. Various organic materials may be bonded to cured silicone rubber by applying the adhesive over the surface of the silicone rubber, laying on an organic material, and then curing the organic material, such as ethylene-propylene terpolymer rubber, chloroprene rubber or epoxy resin.

An object of the present invention is to provide an adhesive which can tightly bond silicone rubbers to organic materials, such as various synthetic rubbers and plastics.

DESCRIPTION OF THE INVENTION

An adhesive for silicone rubbers is characterized as consisting of (A) 100 weight parts of organopolysiloxane produced by the condensation reaction of alkenyl group containing alkoxysilane with the general formula

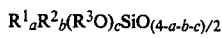

$$R^1_a R^2_b (R^3O)_c SiO_{(4-a-b-c)/2}$$

where $R^1$ is an alkyl or aryl group, $R^2$ is an alkenyl group, $R^3$ is a hydrogen atom or alkyl group, a is 0.0 to 1.0 on average, b is 0.1 to 2.0 on average, c is 0.1 to 2.5 on average and a+b+c is 1 to 3 on average, (B) 0.01 to 200 weight parts condensation reaction catalyst and (C) 0.1 to 300 weight parts organoperoxide.

By way of explanation, the organopolysiloxane comprising component (A) is the principal component of the silicone rubber adhesive of the present invention. $R^1$ in the general formula is an alkyl or aryl group. The alkyl groups are exemplified by unsubstituted alkyl groups such as methyl, ethyl and n-propyl; haloalkyl groups such as 3-chloropropyl and 3,3,3-trifluoropropyl and cycloalkyl groups such as cyclohexyl. The alkyl groups preferably contain a small number of carbon atoms from the standpoint of mineral oil resistance, that is, they are less than or equal to $C_6$ alkyl groups. Examples of the aryl groups are phenyl and naphthyl. $R^1$ is present in a quantity such that a in the general formula is 0.0 to 1.0 (including zero) on average. When a exceeds 1.0 on average, the adhesiveness of the resulting adhesive tends to decline. $R^2$ is an alkenyl group and is exemplified by vinyl, allyl and 2-butenyl. $R^2$ is present in a quantity such that b in the general formula is 0.1 to 2.0 on average. When b is less than 0.1 on average, the adhesiveness of the resulting adhesive significantly declines. When b exceeds an average of 2.0, the physical properties of the obtained adhesive itself decline and its adhesiveness is consequently reduced. $R^3$ is a hydrogen atom or alkyl group and these alkyl groups are exemplified as for $R^1$. Unsubstituted alkyl is preferred. In the general formula, c averages 0.1 to 2.5 and preferably 0.5 to 2.5. When c is less than an average of 0.1, the obtained adhesive itself has an inadequate curability. In particular, the resulting adhesive of the present invention has a reduced air-dryability in its application as a primer and will not exhibit a tough adhesiveness. When c exceeds an average of 2.5, the molecular weight of the instant organopolysiloxane becomes so small that the adhesive itself suffers from a decline in physical properties with the result that its shear adhesive strength is degraded. In addition, the cured film of the obtained adhesive will be harder and it will not be able to follow thermal expansion of the silicone rubber or other synthetic rubber and thus will be unable to maintain a satisfactory adhesive strength.

The degree of polymerization of this component is equal to or greater than 2 in all cases, but 2 to 40 is preferred and 5 to 20 is more preferred because such values provide a high adhesiveness and an excellent workability in coating. The molecular configuration of this component is straight chain, branched chain, network or three dimensional, but network and three-dimensional structures are preferred because these give strong cured films and a high adhesiveness.

This component may be a single compound or a mixture of different types of compounds.

This component is produced, for example, by the hydrolysis-condensation of organoalkoxysilane which contains silicon-bonded alkenyl. This reaction may consist of the hydrolysis-condensation of 1 or several organoalkoxysilanes which contain silicon-bonded alkenyl, such as vinyltrimethoxysilane, allyltrimethoxysilane, vinyltriethoxysilane, allyltriethoxysilane, vinyltripropoxysilane, methylvinyldimethoxysilane and methylvinyldiethoxysilane, or alternatively, this reaction may consist of the cohydrolysis-condensation of the above-mentioned organoalkoxysilane with other organoalkoxysilane such as methyltrimethoxysilane, phenyltriethoxysilane, dimethyldiethoxysilane, methylphenyldimethoxysilane or trimethylmethoxysilane. A small quantity of alkali metal hydroxide, such as sodium hydroxide or potassium hydroxide, etc., is used here as the hydrolysis catalyst.

Component (B) is a catalyst which cures component (A) via a condensation reaction and, in particular, it imparts air-dryability to the present invention's adhesive in its application as a primer for cured silicone rubbers. Examples of component (B) are organotitanate esters, titanium complexes and titanium chelate compounds such as tetraisopropyl titanate, tetra(n-butyl)-titanate, tetra(2-ethylhexyl)titanate, the condensation products of these organotitanate esters, dialkoxytitanium acetylacetonates, titanium bisacetylacetonate, polytitanium acetylacetonate, titanium glycolate, titanium lactate, the ethyl ester of titanium lactate and titanium triethanolaminate, organozirconate esters; organotin compounds such as stannous octoate and dibutyltin dilaurate, and organohalosilanes such as methyltrichlorosilane and dimethyldichlorosilane. Among these, the organotitanium compounds mentioned above are particularly preferred because they both cure component (A) and also improve the adhesion of the adhesive of the present invention to silicone rubbers.

This component (B) is blended at 0.01 to 200 weight parts and preferably 0.05 to 100 weight parts per 100 weight parts component (A). When this quantity is less than 0.01 weight parts, the obtained adhesive has a reduced adhesion for silicone rubber and, in particular, it has a reduced air-dryability in its application as an adhesive for cured silicone rubbers. When this quantity exceeds 300 weight parts, the adhesive will not give a good film and the curing of silicone rubber compositions tends to be inhibited, especially addition-curing silicone rubber compositions.

Component (C) improves the adhesion between silicone rubbers and organic materials such as synthetic rubbers, plastics, etc. Examples of these organoperoxides are dialkyl peroxides, peroxy esters, hydroperoxides, ketone peroxides, peroxyketals, diacyl peroxides and silyl peroxides. Although many commercial products are available, there is no restriction on the organoperoxide to be used as long as it is miscible with silicone compounds. Among such compounds, dialkyl peroxides, peroxy esters and silyl peroxides are preferred because they are only weakly sensitive to peroxide decomposition accelerators, such as metal salts and amines, etc., and so readily retain their stability at room temperature. Dialkyl peroxides are particularly preferred.

Actual examples of the above organoperoxides are di-t-butyl peroxide, t-butyl cumyl peroxide, dicumyl peroxide, alpha,alpha'-bis(t-butylperoxy)diisopropylbenzene, and 2,5-dimethyl-2,5-di(t-butylperoxy)hexane.

This component is blended at 0.1 to 300 weight parts and preferably 5 to 100 weight parts per 100 weight parts component (A). Bonding is weak when this quantity is less than 0.1 weight part. When this quantity exceeds 300 weight parts, the initial adhesive strength is improved, but the mechanical strength of the cured film of the present invention's adhesive is reduced, which tends to reduce the durability of adhesion. In practical applications, the blending quantity of organoperoxide will depend on the type of silicone rubber and organic material adherends. The appropriate selection of the blending quantity is based on the considerations that the blending quantity will be larger for cured silicone rubbers with poorly bondable surfaces while the blending quantity is reduced to the minimum for silicone rubbers with readily bondable surfaces.

In order to dissolve components (A) through (C), an organic solvent may optionally be used in the adhesive of the present invention in addition to the above-mentioned components (A) through (C). This will serve to improve the coatability. Examples of these organic solvents are toluene, xylene, benzene, heptane, hexane, trichloroethylene, perchloroethylene, methylene chloride, methanol, ethanol, isopropanol and butanol. These organic solvents may be employed individually or as a mixture of 2 or more solvents. The blending quantity of organic solvent based on components (A) and (B) is unrestricted and is appropriately determined by taking into consideration the solubility of components (A) and (B) and the viscosity and coatability of the dissolved material.

When the silicone rubber adhesive of the present invention is used as a primer, an alcohol, for example, isopropanol, is preferred as the organic solvent because this prolongs the storage stability and use time of the adhesive and provides good wetting of cured silicone rubber surfaces.

The silicone rubber adhesive of the present invention is readily produced by simply mixing components (A) through (C) to homogeneity. At this time, the components should be mixed under an atmosphere with a minimum moisture content and stored in a tightly sealed container.

In the present invention, thermal stabilizers; pigments; inorganic fillers; organoalkoxysilanes such as alkenyltrialkoxysilane and alkylalkenyldialkoxysilane; tetraalkoxysilane; alkyl polysilicate; and organopolysiloxane other than component (A) such as methylvinylpolysiloxane may be optionally added and blended unless the goal of the invention is adversely affected.

To bond a silicone rubber to an organic material using the adhesive of the present invention, the adhesive of the present invention is, for example, applied to the surface of an organic material such as a cured rubber (including a silicone rubber) or plastic, and then cured while in contact with a curable silicone rubber composition. Curing is preferably conducted here at elevated temperatures and pressures. Alternatively, the adhesive of the present invention is applied to the surface of a cured silicone rubber and then cured while in contact with a curable rubber composition (including curable silicone rubber compositions) or plastic. Curing is preferably conducted here at elevated temperatures and pressures.

The curable silicone rubber component or curable silicone rubber composition used in the above process preferably contains organoperoxide.

EXAMPLE

Methods for producing component (A) will be explained using reference examples and the invention will be explained using examples of execution. The viscosity and physical properties are measured at 25° C.

REFERENCE EXAMPLE 1

Production of organopolysiloxane (a) as a component (A)

First, 148 g (1 mole) vinyltrimethoxysilane (SZ 6300 from Toray Silicone Co., Ltd.) was placed in a 1 L, three-neck flask equipped with a blade stirrer and a reflux condenser, and this was heated to 50° C. Then 9.0 g (0.5 moles) ion-exchanged water was gradually added in portions. The mixture was then heated to 65° C., a solution of 0.01 g sodium hydroxide in 0.1 g ion-exchanged water was added and this was then reacted with stirring for 1 hour while the methyl alcohol by-product was removed from the reaction system. The reaction was ended when methanol distillation ceased. Unreacted vinyltrimethoxysilane and methanol by-product were removed by heating in vacuo. The resulting reaction residue was neutralized with trichlorosilane, neutralized again with sodium bicarbonate, analyzed and found to be a vinylpolysiloxane with a weight average molecular weight of 600 as the condensation product of vinyltrimethoxysilane.

With regard to the quantities of functional groups, there were 1 vinyl groups and from 1.0 to 2.0 methoxy groups per silicon atom. The viscosity was 7 cS.

REFERENCE EXAMPLE 2

Production of organopolysiloxane (b) as a component (A)

A vinylpolysiloxane was produced as described in Reference Example 1 with the exception that 20 g (1.12 moles) ion-exchanged water was used. The analytical results indicated that the product was partially three-dimentional vinylpolysiloxane with a weight average molecular weight of 4000.

With regard to the quantities of functional groups, there were 1 vinyl group and from 0.3 to 1.2 methoxy groups per silicon atom. The viscosity was 47 cS.

EXAMPLE 1

First, 80 weight parts of the organopolysiloxane (a) produced in Reference Example 1 was combined and mixed to homogeneity with 40 weight parts tetra(n-butyl)titanate and 20 weight parts 2,5-dimethyl-2,5-di(t-butylperoxy)hexane to produce an adhesive. This adhesive was coated on a 5 mm thick sheet of a cured silicone rubber (the peroxide-vulcanized silicone rubber composition SH52U from Toray Silicone Co., Ltd.) and this was then allowed to stand for 30 minutes. A 3 mm thickness of an ethylene-propylene terpolymer (EPDM) composition containing 1.0 weight percent dicumyl peroxide as vulcanizer was placed on the adhesive-coated surface and this was then cured at 170° C./25 kg/cm$^2$ for 10 minutes. A test specimen was produced in which the ethylene-propylene terpolymer was tightly bonded to the silicone rubber. A tensile peeling test of the test piece was conducted by peeling test method described in JIS K6301-1975, "Test Methods for Vulcanized Rubber". The results show that the peeling strength exceeded 4.1 kg. The failure mode of the peeled surface was failure of the rubber layer over the entire surface (cohesive failure).

EXAMPLE 2

Portions of the organopolysiloxane (b) produced in Reference Example 2 were combined and mixed to homogeneity with tetra(n-butyl)titanate, followed by the addition of 2,5-dimethyl-2,5-di(t-butylperoxy)hexane and mixing to homogeneity. One of the resulting mixtures was dissolved in isopropyl alcohol. The adhesives with the compositions reported in Table 1 were produced. The obtained adhesive were coated on a test piece (width 30 mm × length 100 mm × thickness 3 mm) consisting of the vulcanized product of silicone rubber composition SH1135U (Toray Silicone Co., Ltd.) and on a test piece (width 30 mm × length 100 mm × thickness 3 mm) consisting of the vulcanized product of blend rubber composition SE4306 (composed of an ethylene-propylene terpolymer (EPDM) composition and a silicone rubber composition, from Toray Silicone Co., Ltd.) and these are then allowed to stand and air-dry at room temperature for 60 minutes. A 3 mm thickness of an ethylene-propylene terpolymer (EPDM) composition containing 1.0 weight percent dicumyl peroxide as vulcanizer was placed on the adhesive-coated surfaces and these were then cured at 170° C./25 kg/cm$^2$ for 10 minutes. Test pieces were produced in which the ethylene-propylene terpolymer was tightly bonded to silicone rubber and in which the ethylene-propylene terpolymer was tightly bonded to the silicone rubber/ethylene/propylene terpolymer blend rubber.

Tensile testing of the test pieces was conduced by the peeling test method of JIS K6301-1975, "Test Methods for Vulcanized Rubber". The results are reported in Table 2.

For comparison, bonding was examined using adhesives from which a component of the above-described adhesive has been omitted as shown in Tables 1 and 2.

TABLE 1

| | Composition of Adhesives | | | | |
|---|---|---|---|---|---|
| | Adhesive No. | | | | |
| | Present Invention | | Comparison Examples | | |
| Component | 1 | 2 | 3 | 4 | 5 |
| organopolysiloxane (b) of Reference Example 2 | 80 | 80 | 80 | 80 | 0 |
| tetra(n-butyl) titanate | 20 | 20 | 20 | 0 | 20 |
| 2,5-dimethyl-2,5-di(t-butyl-peroxy)hexane | 10 | 20 | 0 | 20 | 20 |
| isopropyl alcohol | 0 | 160 | 0 | 0 | 0 |

NOTE: the numbers in the table are weight parts

TABLE 2

| | | Results of Adhesion Testing | | | | |
|---|---|---|---|---|---|---|
| | | Adhesive No. | | | | |
| | | Present Invention | | Comparison Examples | | |
| Adherend | | 1 | 2 | 3 | 4 | 5 |
| Silicone Rubber (SH1135) | Peel Strength kg/cm$^2$ | 4.4 | 4.5 | 0.9 | 0.5 | 0 |
| | Failure Mode | rubber layer failure over entire sur- | rubber layer failure over entire sur- | partial rubber layer failure | partial rubber layer failure | interfacial peeling over entire |

TABLE 2-continued

| | | Results of Adhesion Testing Adhesive No. | | | | |
|---|---|---|---|---|---|---|
| | | Present Invention | | Comparison Examples | | |
| Adherend | | 1 | 2 | 3 | 4 | 5 |
| Silicone Rubber-EPDM blend rubber (SE4306) | Peel Strength kg/cm² | face (100%) 4.3 | face (100%) 4.5 | (20%) 2.1 | (20%) 1.0 | surface (0%) 0 |
| | Failure Mode | rubber layer failure over entire surface (100%) | rubber layer failure over entire surface (100%) | partial rubber layer failure (20%) | partial rubber layer failure (20%) | interfacial peeling over entire surface (0%) |

NOTE: the numbers in ( ) are % failure in the rubber

EXAMPLE 3

First, 80 weight parts of organopolysiloxane (b) produced in Reference Example 2 was combined and mixed to homogeneity with 20 weight parts tetra(n-butyl)titanate and 20 weight parts 2,5-dimethyl-2,5-di(t-butylperoxy)hexane to produce an adhesive.

The adhesive was coated on a test piece (width 30 mm×length 100 mm×thickness 3 mm) consisting of the cured product of an ethylene-propylene terpolymer (EPDM) and then allowed to stand and air-dry at room temperature for 40 minutes. A 3 mm thickness of silicone rubber composition SH52U (Toray Silicone Co., Ltd.) containing 1.0 weight percent 2,5-dimethyl-2,5-di(t-butylperoxy)hexane as vulcanizer was placed on the adhesive-coated surface. The silicone rubber composition was then cured at 170° C./25 kg/cm² for 10 minutes. A test piece was produced in which the silicone rubber was tightly bonded to the above-mentioned adherend. Tensile peeling testing of the test piece was conducted by the peeling method in JIS K6301-1975, "Test Methods for Vulcanized Rubber". The results showed that the peeling strength exceeded 4.1 kg and the failure mode of the peeled surface was failure in the rubber layer over the entire surface (cohesive rupture).

EXAMPLE 4

Organopolysiloxane (b) produced in Reference Example 2 was combined and mixed to homogeneity with various organotitanium compounds and various organoperoxides as shown in Table 3. One of the resulting mixtures was also combined with isopropyl alcohol as a solvent. The adhesives shown in Table 3 were produced. The produced adhesives were coated on moldings of various organic materials and then allowed to stand at room temperature for 60 minutes. Silicone rubber composition SH52U (from Toray Silicone Co., Ltd.) containing 1.0 weight percent 2,5-dimethyl-2,5-di(t-butylperoxy)hexane as vulcanizer was coated to a thickness of 3 mm on the adhesive-coated surfaces and the silicone rubber composition was then cured at 170° C./25 kg/cm² for 10 minutes. Test pieces were obtained in which silicone rubber was bonded to various organic materials. Tensile peeling testing of the test pieces was conducted by the peeling test method in JIS K6301-1975, "Test Methods for Vulcanized Rubber". The results are reported in Table 4.

TABLE 3

| | Composition of Adhesives | | | | | | |
|---|---|---|---|---|---|---|---|
| | Adhesive No. | | | | | | |
| | Present Invention | | | | | Comparison Examples | |
| Components | 6 | 7 | 8 | 9 | 10 | 11 | 12 |
| organopolysiloxane (b) of Reference Example 2 | 40 | 40 | 40 | 40 | 40 | 40 | 40 |
| tetra(n-butyl) titanate | 10 | 0 | 10 | 10 | 10 | 0 | 10 |

TABLE 3-continued

| | Composition of Adhesives | | | | | | |
|---|---|---|---|---|---|---|---|
| | Adhesive No. | | | | | | |
| | Present Invention | | | | | Comparison Examples | |
| Components | 6 | 7 | 8 | 9 | 10 | 11 | 12 |
| titanium bisacetylacetone | 0 | 10 | 0 | 0 | 0 | 0 | 0 |
| 2,5-dimethyl-2,5-di(t-butylperoxy)hexane | 10 | 10 | 0 | 0 | 10 | 10 | 0 |
| di-t-butyl peroxide | 0 | 0 | 20 | 0 | 0 | 0 | 0 |
| dicumyl peroxide | 0 | 0 | 0 | 20 | 0 | 10 | 0 |
| isopropyl alcohol | 0 | 0 | 0 | 0 | 80 | 0 | 0 |

NOTE: the numbers in the table are weight parts

TABLE 4

| | Results of Adhesion Testing | | | | | | |
|---|---|---|---|---|---|---|---|
| | Adhesive No. | | | | | | |
| | Present Invention | | | | | Comparison Examples | |
| Adherend | 6 | 7 | 8 | 9 | 10 | 11 | 12 |
| EPDM | w | w | x | x | w | y | y |
| chloroprene rubber | x | x | x | x | x | z | y |
| epoxy resin | x | x | x | x | x | y | y |
| silicone rubber | w | x | x | x | w | z | z |

NOTE:
w: failure in rubber layer over entire surface (100% cohesive failure)
x: partial failure in rubber layer (90-100% cohesive failure)
y: partial failure in rubber layer (10-50% cohesive failure)
z: peeling at the interface over entire surface (0% cohesive failure)

That which is claimed is:
1. An adhesive for silicone rubbers characterized as consisting of
   (A) 100 weight parts organopolysiloxane produced by the condensation reaction of alkenyl group containing alkoxysilane, with the general formula $R^1_a R^2_b (R^3O)_c SiO_{(4-a-b-c)/2}$ where $R^1$ is an alkyl or aryl group, $R^2$ is an alkenyl group, $R^3$ is a hydrogen atom or alkyl group, a is 0.0 to 1.0 on average, b is 0.1 to 2.0 on average, c is 0.1 to 2.5 on average and a+b+c is 1 to 3 on average,
   (B) 0.01 to 200 weight parts condensation reaction catalyst and
   (C) 0.1 to 300 weight parts organoperoxide.
2. Adhesive described in claim 1 wherein the condensation reaction catalyst is an organotitanium compound.
3. Adhesive described in claim 1 wherein the organoperoxide is a dialkyl peroxide.
4. Adhesive described in claim 1 wherein the organopolysiloxane comprising component (A) is the compound produced by the condensation reaction of vinyltrimethoxysilane, the condensation reaction catalyst (B) is tetra(n-butyl)titanate, and the organoperoxide is 2,5-dimethyl-2,5-di(t-butylperoxy)hexane.
5. The adhesive of claim 1 in which the alkenyl group containing alkoxysilane is of the formula $R^2 Si(OR^3)_3$ where $R^2$ is selected from the group consisting of vinyl and allyl and $R^3$ is selected from the group consisting of methyl, ethyl, and propyl.

* * * * *

UNITED STATES PATENT AND TRADEMARK OFFICE
CERTIFICATE OF CORRECTION

PATENT NO. : 4,766,193

DATED : August 23, 1988

INVENTOR(S) : Katsuyoshi Nakasuji, Ryuzo Mikami, Kazuo Hiria, and Takao Matsushita It is certified that error appears in the above-identified patent and that said Letters Patent is hereby corrected as shown below:

On the title page

Inventors: "Kazuo Hiria" should read --Kazuo Hirai--.

Signed and Sealed this

Twenty-third Day of May, 1989

Attest:

DONALD J. QUIGG

Attesting Officer

Commissioner of Patents and Trademarks